Figure 1:
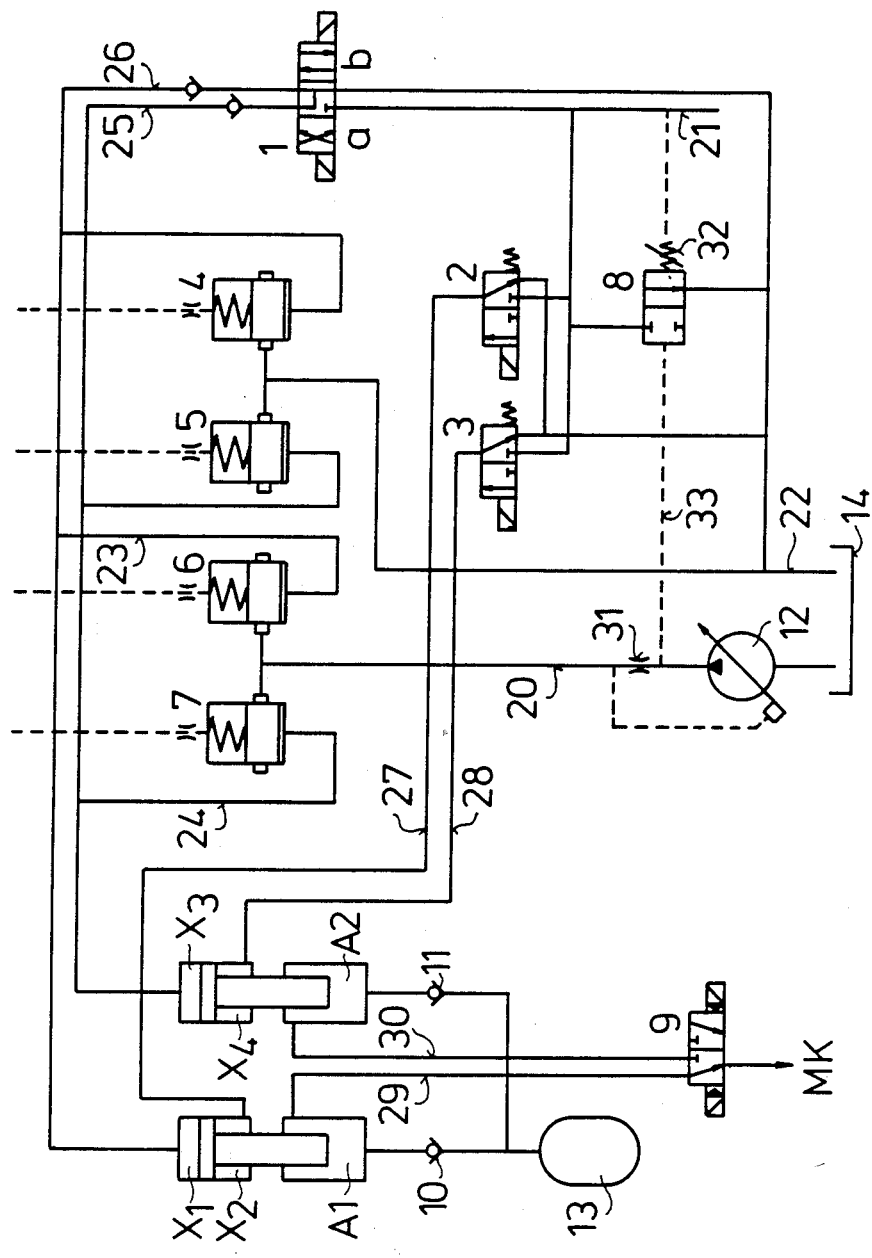

United States Patent

Becker et al.

[11] Patent Number: 4,865,226
[45] Date of Patent: Sep. 12, 1989

[54] METERING AND MIXING OF MULTI-COMPONENT PLASTICS

[75] Inventors: Gunther Becker, Geretried; Gerhard Reisinger, Egling; Peter Taubenmann, Munich; Norbert Lisker, Wolfratshausen, all of Fed. Rep. of Germany

[73] Assignee: Elastogran Polyurethane GmbH, Lemförde, Fed. Rep. of Germany

[21] Appl. No.: 181,375

[22] Filed: Apr. 14, 1988

[51] Int. Cl.[4] .............................................. B67D 5/52
[52] U.S. Cl. ..................... 222/135; 222/55; 222/255; 222/275; 222/278; 222/280; 222/334; 222/380
[58] Field of Search ............... 222/275, 334, 135, 255, 222/52, 63, 55, 61, 380, 132, 145, 252, 263, 265, 278, 280

[56] References Cited

U.S. PATENT DOCUMENTS

| | | | |
|---|---|---|---|
| 711,144 | 10/1902 | Wright | 222/255 |
| 1,569,300 | 1/1926 | Purvis | 222/255 |
| 4,116,364 | 9/1978 | Culbertson et al. | 222/334 |
| 4,195,752 | 4/1980 | Heimgartner et al. | 222/255 |
| 4,616,978 | 10/1986 | Matheson et al. | 222/135 |

FOREIGN PATENT DOCUMENTS

3329296C2 2/1985 Fed. Rep. of Germany .

Primary Examiner—Andres Kashnikow
Assistant Examiner—Mark T. Le
Attorney, Agent, or Firm—Keil & Weinkauf

[57] ABSTRACT

A method and apparatus for metering and mixing multi-component plastics, in particular polyurethane, in which two or more hydraulic piston and cylinder units ($A_1$ and $A_2$) for each component, operate periodically by a balanced procedure. The pressure for the second piston and cylinder unit which takes over metering is equilibrated, before the beginning of the metering procedure, with the pressure of the first piston and cylinder unit which is in the process of metering. Switching from one piston and cylinder unit to the other (e.g. from $A_1$ to $A_2$) takes place in such a way that metering is taken over by the second piston and cylinder units at the same time as the first piston and cylinder unit is switched off. This is achieved by providing a pilot valve which has zero overlap and inevitably releases the component stream from the first piston and cylinder unit at the same time as the other piston and cylinder unit is switched off. Pressurization and pressure equilibration are effected by a hydraulic control apparatus which is incorporated in the hydraulic loop of the volume stream and automatically equilibrates the initial pressure with the metering pressure. This permits pressurization and pressure equilibration without additional parts in the component system.

1 Claim, 2 Drawing Sheets

METERING AND MIXING OF MULTI-COMPONENT PLASTICS

The present invention relates to a method and an apparatus for metering and mixing multi-component plastics.

In the area of multicomponent plastics processing discussed here, there are in principle two known possible methods for metering components. One possibility is to use continuously metering pumps for the components, the said pumps being, for example, rotary piston pumps. The other possibility is to use conventional piston pumps. In the second case, the procedure is batchwise since filling and metering strokes are carried out in succession.

German Patent 3,329,296 discloses a method and an apparatus for the type state at the outset, in which the use of two piston and cylinder units for each component permits virtually continuous operation. This takes place in this known apparatus by a procedure in which first one piston and cylinder unit forces out, ie. meters, the component. Before this first piston and cylinder unit has reached the end of its metering stroke, the pressure in the other piston and cylinder unit is brought to the metering pressure, and this second piston and metering unit, which has been filled with component material beforehand, is switched in, so that both piston and metering units together perform a metering stroke over a certain period. This is intended to produce uniform metering. Moreover, it is intended to avoid pressure jumps which may occur on switching from one piston and cylinder unit to the other, so that a plastics product of constant quality can be produced. In this known apparatus, a third piston and cylinder unit is provided to produce the initial pressure; in the said unit, a certain stock of component material is available and can be used for producing the initial pressure and hence for equilibration. This amount of component material which is available for producing the initial pressure is not circulated, so that separation and the associated disadvantages may occur here. Furthermore, this type of pressure equilibration can lead to an undesirable change in the mixing ratio and the delivery.

In particlar, the overlap, ie. the joint movement of the pistons of both piston and cylinder units, results in a corresponding reduction in the time available for each piston and cylinder unit for filling. Hence, high filling speeds are required. For such high requirements, expensive filling pumps must additionally be used.

It is an object of the invention to provide a method and an apparatus of the type stated at the outset, and on the one hand to ensure a continuous procedure without difficulties on switching from one piston and cylinder unit to the other, and on the other hand to avoid joint movement of the pistons of both piston and cylinder units during metering, in order to have sufficient time avaiable for filling.

We have found that this object is achieved by the method and apparatus of the present invention;

According to the invention, the two piston and cylindr units of one component are controlled, by switching a pilot valve with zero overlap in to the component stream downstream of the piston and cylinder units, in such a way that there is no longer any overlap of the ejection movements of their pistons. A piston and cylinder unit takes over metering only when the other piston and cylinder unit is switched off, and does so virtually simultaneously. A joint ejection movement, which would in practice reduce the filling time, does not take place. Pressure jumps and hence disadvantages in the production of the corresponding plastics articles are avoided by exact and automatic pressure equilibration and by precise switching (zero overlap).

In one embodiment of the invention, the initial pressure and pressure equilibration are produced not by a correspondingly complicated and expensive third piston and cylinder unit but by a simple hydraulic circuit. Furthermore, there are no disadvantages with regard to component material remaining stationary in the pressurizing unit since the entire pressurizing procedure is carried out by the hydraulic system. Since pressurization and pressure equilibration are effected automatically, pressure jumps during switching are reliably prevented. In the invention, the entire control is effected by the hydraulic system, so that it is possible to use commercial hydraulic components which, unlike control elements used in the component system, do not stick or tend to exhibit considerable wear.

The invention is illustrated below by means of an embodiment and with reference to the drawing.

Figure 2:
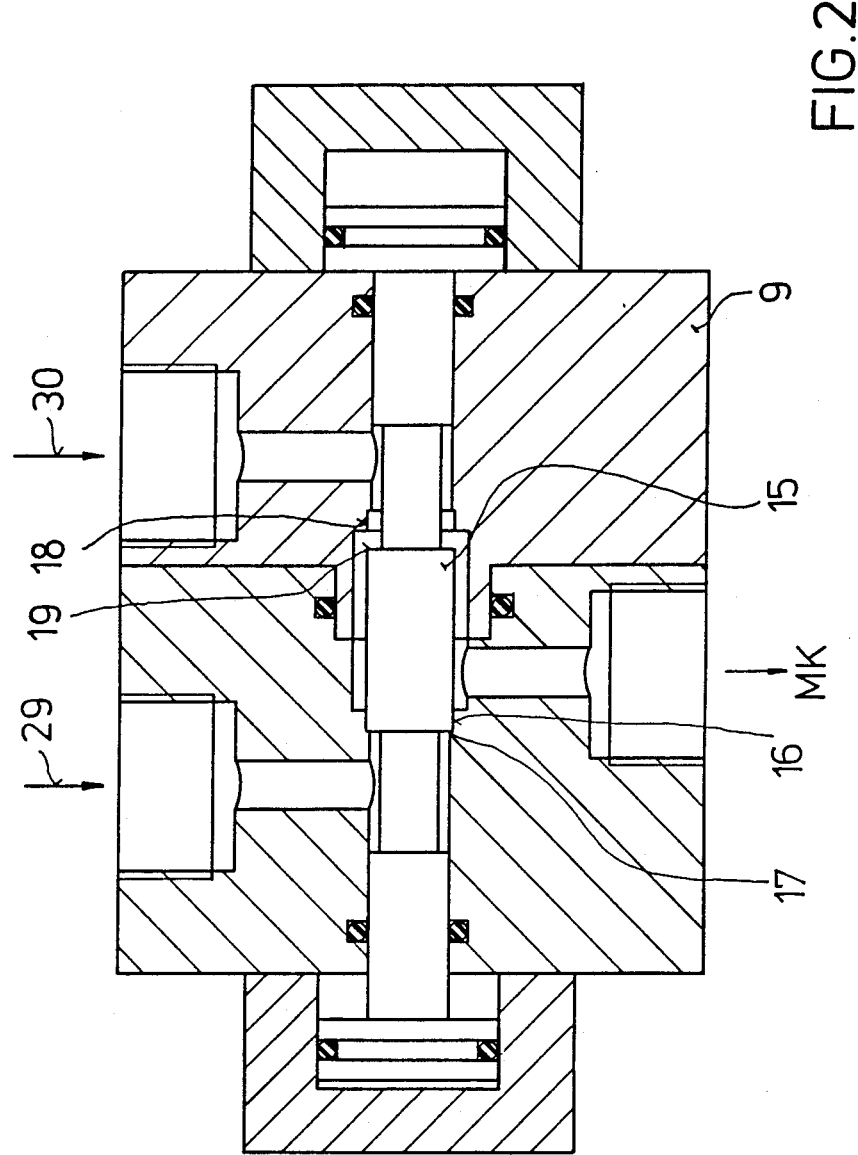

FIG. 1 shows a connection scheme for an apparatus for carrying out the novel method for one component system and FIG. 2 shows, on an enlarged scale, a section through a pilot valve with zero overlap, to be used in the component system.

The connection diagram in FIG. 1 merely shows the essential parts for one component system. The other component system is identical.

A storage tank 13 is provided for each component. A pilot valve 9 whose outlet leads to a common mixing head MK is likewise provided for each component.

Two piston and cylinder units $A_1$ and $A_2$ are provided for a component. The limit switches of the hydraulic system of the two piston and cylinder units are denoted by $X_1$, $X_2$ and $X_3$, $X_4$. Filling lines lead from the storage tank 13 via non-return valves 10 and 11 to each piston and cylinder unit $A_1$, $A_2$. Forward-flow lines 29 and 30 lead from each piston and cylinder unit to the pilot valve 9.

The hydraulic control is formed by three directional valves 1, 2 and 3, which are shown in their starting position. Four cartridge valves 4, 5, 6 and 7 are also provided; these valves are closed in the starting position, and their pilot valves are not shown. A hydraulic control apparatus 8 is als provided. The tank for the hydraulic medium is denoted by 14. The various hydraulic lines are denoted by 21 to 28.

FIG. 2 shows the pilot valve 9 in section, the drawing being essentially to scale, so that the zero overlap is visible.

The valve seat 16 and control edge 17 for one side, to which the forward-flow line 29 leads, are dimensioned and matched with the valve seat 18 and the control edge 19 of the other side, to which the forward-flow line 30 leads, in such a way that the component stream to the mixing head from the forward-flow line 29 is released at the same time as the component stream from the forward-flow line 30 is shut off. Such a valve having such a closure element 15 is a pilot valve with zero overlap.

The mode of operation of the apparatus, beginning with a starting position, is described below.

The piston of the piston and cylinder unit $A_1$ is in the upper position, ie. the limit switch $X_1$ gives an appropriate signal. The piston of the other piston and cylinder unit A₂ is in the lower position, ie. the limit switch X₄ likewise gives an appropriate signal. When the valve 6 is opened, metering medium flows from the hydraulic pump 12 via the lines 20 and 23 to the piston and cylinder unit A₁. The displaced metering medium flows via the line 27 and the directional valve 2 into the line 22 and thus into the tank 14. The piston of the piston and cylinder unit A₁ moves downward and forces component material via the forward-flow line 29 and the pilot valve 9 to the mixing head MK. The non-return valve 10 prevents flow back to the storage tank 13.

The multi-way valve 3 switches simultaneously with the valve 6 and opens the valve 5. The volume stream produced by a volume stream source which is not shown flows via the line 21, the directional valve 3 and the line 28 to the piston and cylinder unit A₂, with the result that the piston is moved upward.

The displaced metering medium is forced via the valve 5 and the line 22 to the tank 14. The non-return valve 11 opens, and component material flows from the storage tank 13 to the piston and cylinder unit A₂, so that the latter is filled. When the piston of the piston and cylinder unit A₂ reaches its upper position, the limit switch X₃ gives an appropriate signal. The valve 5 now closes, and the directional valve 3 switches to its starting position. The directional valve 1 switches to the position b. The volume stream from the line 21 now flows via the line 25 to the piston and cylinder unit A₂ and pressurizes the component material in this piston and cylinder unit A₂ and the line 30 as far as the pilot valve 9. The pilot valve 9 closes the line 10 so that it is leak-proof.

The hydraulic control apparatus 8 ensures that the initial pressure in the piston and cylinder unit A₂ corresponds exactly to the metering pressure in the piston and cylinder unit A₁.

When the piston of the piston and cylinder unit A₁ reaches its lower position, the limit switch X₂ gives a signal. The valve 6 now closes and the valve 7 opens. At the same time, the pilot valve 9 switches. The metering stream now flows via the line 20, the valve 7 and the line 24 to the piston and cylinder unit A₂ and moves its piston downward, with the result that the component material is forced out via the line 30 and the pilot valve 9 to the mixing head. The directional valve 1 switches to its starting position, and the directional valve 2 switches to permit the volume stream to flow from the line 21 into the line 27. The volume stream flows to the piston and cylinder unit A₁ and moves its piston upward. Since the valve 4 too opens, the displaced metering medium can flow via this valve 4 into the line 22 and thus to the tank 14. Since the non-return valve 10 opens automatically, the piston and cylinder unit A₁ is filled with component material. When the piston of the piston and cylinder unit A₁ again reaches its uppermost positons, the limit X₁ gives a signal. The valve 4 now closes, and the directional valve 2 switches to its starting position. The directional valve 1 changes to its position a. The stream of the metering medium from the line 21 now flows via the line 26 to the piston and cylinder unit A₁ and pressurizes the component material in the piston and cylinder unit A₁ and in the line 29 as far as the pilot valve 9. The non-return valve 10 prevents flow back into the storage tank 13. The hydraulic control apparatus 8 again effects precompression to a pressure which corresponds to the metering pressure in the piston and cylinder unit A₂.

When the piston of the piston and cylinder unit A₂ reaches its lower position, the switch X₄ gives a signal. The valve 7 now closes, and the valve 6 opens again. At the same time, the pilot valve 9 switches. Metering it again effected by the piston and cylinder unit A₁. The directional valve 1 again changes to its starting position. By opening the valve 5 and by switching the directional valve 3, the filling process in the piston and cylinder unit A₂ is once again initiated.

Pressure equilibration during pressurization is described in detail below.

To pressurize the component in a filled piston and cylinder unit, the volume stream used is that which also serves for filling. To avoid metering errors after pressurization, the initial pressure should be equal to the metering pressure. A lower initial pressure leads to pressure loss during change of metering. If the initial pressure is too high, volume errors occur due to decompression. This task is performed by the hydraulic control apparatus 8.

The hydraulic control apparatus shown is a two/two-way valve is closed in the starting position, ie. is kept closed by control medium which is removed from the metering pump 12.

During pressurization, the pressure in the line 21 increases, and equilibrium is produced between pressure in the line 33 and the initial pressure plus spring 32. The pressure in line 33 is greater than the metering pressure in line 20, the difference being equal to the constant pressure drop across the restrictor 31. This difference is compensated by the spring 32. At this equilibrium, the hydraulic control apparatus 8 opens and the additional volume stream flows to the tank 14. Thus, it is ensured that the initial pressure exactly balances the metering pressure. Moreover, the initial pressure always automatically matches the particular metering pressure required. During operation, resetting is not necessary when production conditions are changed.

The volume stream for filling and pressurizing in the line 21 can be provided in various ways, either by means of a separate volume stream source (constant or regulating pump) or by removing a part stream from the stream from the metering pump.

The volume stream in line 21 must be such that the filling speed of the piston of the particular piston and cylinder unit is always greater than the metering speed of the piston of the other piston and cylinder unit. This is necessary so that, when the filling process is complete, the particular piston and cylinder unit has sufficient time to pressurize the component material to the metering pressure.

We claim:

1. Apparatus for metering and mixing multicomponent plastics which comprises:
   (a) a mixing head (MK);
   (b) at least two hydraulic piston and cylinder units (A₁ and A₂) for each component, which units operates in opposed cycles;
   (c) component lines (29 and 30) connecting the piston and cylinder units with the mixing head;
   (d) a pilot valve (9) with zero overlap provided in each of the component lines of the piston and cylinder units, the pilot valve being arranged to release the component stream from one piston and cylinder unit when another piston and cylinder unit is switched off;
   (e) a hydraulic metering stream and an additional volume stream connected to the hydraulic piston and cylinder units; and
   (f) a hydraulic control means connected between the hydraulic metering stream and the additional volume stream for ensuring that an initial pressure in one piston and cylinder unit corresponds to a metering pressure in another piston and cylinder unit.

* * * * *

UNITED STATES PATENT AND TRADEMARK OFFICE
CERTIFICATE OF CORRECTION

PATENT NO. : 4,865,226

DATED : September 12, 1989

INVENTOR(S) : Gunther BECKER et al.

It is certified that error appears in the above-identified patent and that said Letters Patent is hereby corrected as shown below:

ON THE COVER PAGE please insert

-- Foreign Application Priority Data

April 23, 1987   DE   Federal Republic of Germany ... 3713555 --

Signed and Sealed this

Second Day of July, 1991

Attest:

HARRY F. MANBECK, JR.

Attesting Officer

Commissioner of Patents and Trademarks